(12) United States Patent
Bergan et al.

(10) Patent No.: US 8,080,742 B2
(45) Date of Patent: Dec. 20, 2011

(54) MEASUREMENT OF WHEEL AND/OR AXLE LOAD OF ROAD VEHICLES

(75) Inventors: Terrance Arthur Bergan, Saskatoon (CA); Randal Leroy Hanson, Saskatoon (CA)

(73) Assignee: International Road Dynamics, Inc., Saskatoon SK (CA)

( * ) Notice: Subject to any disclaimer, the term of this patent is extended or adjusted under 35 U.S.C. 154(b) by 332 days.

(21) Appl. No.: 12/395,585

(22) Filed: Feb. 27, 2009

(65) Prior Publication Data

US 2010/0126782 A1    May 27, 2010

(51) Int. Cl.
  *G01G 19/02*   (2006.01)
  *G01G 19/03*   (2006.01)
  *G01G 3/14*    (2006.01)
  *G01G 21/22*   (2006.01)

(52) U.S. Cl. ......... 177/132; 177/133; 177/134; 177/211
(58) Field of Classification Search .......... 177/132–135, 177/211
See application file for complete search history.

(56) References Cited

U.S. PATENT DOCUMENTS

| | | | | |
|---|---|---|---|---|
| 3,533,481 | A | * | 10/1970 | Paelian ......................... 177/134 |
| 3,593,263 | A | * | 7/1971 | Olsen ............................ 340/935 |
| 3,835,945 | A | * | 9/1974 | Yamanaka et al. ............ 177/134 |
| 3,949,822 | A | * | 4/1976 | English et al. ................ 177/126 |
| 3,966,003 | A | | 6/1976 | Miller |
| 4,049,069 | A | * | 9/1977 | Tamamura et al. ........... 177/134 |
| 4,098,365 | A | * | 7/1978 | Pietzsch et al. .............. 177/211 |
| 4,134,467 | A | * | 1/1979 | Czyryk ......................... 177/133 |
| 4,203,497 | A | * | 5/1980 | Harris et al. .................. 177/134 |
| 4,223,752 | A | * | 9/1980 | Belcher ......................... 177/211 |
| 4,333,543 | A | | 6/1982 | Pietzsch et al. |
| 4,506,746 | A | | 3/1985 | Lockery |
| 4,616,723 | A | | 10/1986 | Pietzsch |
| 4,775,018 | A | | 10/1988 | Kroll et al. |
| 4,799,381 | A | * | 1/1989 | Tromp ............................ 73/146 |
| 4,848,493 | A | | 7/1989 | Hitchcock |
| 4,880,069 | A | * | 11/1989 | Bradley ........................ 177/211 |
| 4,979,581 | A | | 12/1990 | Kroll |
| 5,135,062 | A | * | 8/1992 | Lockery et al. ............... 177/211 |
| 5,232,064 | A | | 8/1993 | Kroll |
| 5,313,022 | A | * | 5/1994 | Piroozmandi et al. ........ 177/211 |
| 5,585,604 | A | * | 12/1996 | Holm ............................ 177/133 |
| 5,811,738 | A | * | 9/1998 | Boyovich et al. ............. 177/136 |
| 6,177,638 | B1 | | 1/2001 | Murray |
| 7,423,225 | B1 | * | 9/2008 | Kroll et al. .................... 177/132 |

OTHER PUBLICATIONS

European Search Report, EP 09 15 2462 (Dec. 8, 2009).

* cited by examiner

*Primary Examiner* — Randy W Gibson
(74) *Attorney, Agent, or Firm* — Nixon & Vanderhye P.C.

(57) ABSTRACT

The present invention provides an improved weigh-in-motion scale. A slight increase in the thickness of a an upper, flexibly-deformable metal plate in a thin, flexibly-deformable plate system coupled with a change in the transverse locations of the load cells provides the improved weigh-in-motion scale, which is capable of weighing substantially heavier loads than previously known weigh-in-motion scales. In use, as weight is applied to the weigh-in-motion scale, the upper flexibly-deformable metal plate elastically bends. The strain gauges thus provide a changing resistive value proportional to the bending of the flexible element and the weight applied, to generate signals to the Wheatstone bridge circuit, which then provides output signals from the Wheatstone bridge circuit, which are proportional to the force applied to the upper flexibly-deformable metal plate.

17 Claims, 4 Drawing Sheets

MEASUREMENT OF WHEEL AND/OR AXLE LOAD OF ROAD VEHICLES

FIELD OF THE INVENTION

The present invention relates to a weigh-in-motion scale for the measurement of wheel and/or axle loads of road vehicles. More particularly, the present invention relates to weigh-in-motion scales utilizing load sensing structures for generating electrical signals indicative of a load on the weigh-in-motion scale.

BACKGROUND OF THE INVENTION

Wheel and/or axle load measuring plates are known to the art, which utilize one or more strain gauges, which can be associated with appropriate circuitry responding to the distortion of the measuring plate for signalling, indicating, recording or registering the wheel or axle load. Additionally, wheel scales which utilize strain gauge sensors fixed to deflectable load cells are known. However, the specific configuration of the load cells utilized in prior art scales, the placement of the load cells in the housing structures of these scales, and the cooperation of the active and inactive elements of these prior art wheel scale devices often yield complex and bulky wheel scales, which are inaccurate and unrepeatable under many conditions of use.

In one known wheel load indicator of this kind, the webs are formed between circular enlargements of a pair of recesses, and strain gauges are adhered to the opposed walls of these enlargements, i.e., to the two opposed web walls. The recesses themselves are closed.

In another known wheel load indicator, the recesses forming a web between them are of slot-like design starting from the lateral edges of the plate. The strain gauges are adhered to the webs in the plane of the upper surface of the plate. With such an arrangement nothing, but bending stresses of a plate loaded by a wheel can be determined.

U.S. Pat. No. 4,098,365 issued Jul. 4, 1978 to L Pietzsch for "Device for the Measurement of Wheel or Axle Loads of Road vehicles" provided a device for measuring the wheel or axle load of a road vehicle. The device comprised a plate supported along its periphery at selected points or by knife edges in a frame. At least two pairs of wire strain gauges were provided along two imaginary lines of the plate, and which were spaced apart by a distance greater than the length of a contact zone of a wheel on the plate. Each pair of wire strain gauges included a wire strain gauge extending in the direction of displacement of the wheel, i.e. perpendicular to the imaginary lines, and a wire strain gauge parallel thereto.

U.S. Pat. No. 4,333,543 issued Jun. 8, 1982 to L Pietzsch for "Wheel or Axle Load Measuring Device for Road Vehicles" provided a measuring plate with at least one strain gauge. A wheel of a vehicle could rest on that plate to generate a signal, which was used to indicate or register the wheel load or axle load of the road vehicle. The measuring plate was received in a frame and had edges, which extended transversely of the direction of vehicle travel. Those edges were bevelled or partly cut away so as to be overhung by complementarily shaped sides of the frame. Those edges were also provided with elastic bars or ribs along the bottom of the plate. The elastic bars or ribs rested upon and supported the center of the plate above a support plate or body, which was disposed below the measuring plate.

U.S. Pat. No. 4,616,723 issued Oct. 14, 1986 to Ing Ludwig Pietzsch GmbH & Co for "Wheel Load Indicator" provided a wheel load indicator, which comprised a rectangular flat plate of a light material having measuring properties. A series of recesses forming webs were provided along two lateral edges of the plate. Strain gauges were adhesively bonded to walls of bores in the area of the webs to determine the shearing stress under the load of a wheel which has been driven on the bending portion.

U.S. Pat. No. 4,775,018 issued Oct. 4, 1988 to W. P. Kroll et al for "Load Cell Assembly" provided a sealed shear load cell assembly for direct mounting to the load transfer portion of the weighing platform of a scale assembly. The load cell assembly cooperated with the weighing platform to provide a structural load-bearing component for the scale assembly. The top surface section of the beam load cell structure provided a predetermined shear segment in the beam structure. A pair of axially aligned, opposing circular apertures were provided to form stress isolation webs along the longitudinal axis of the beam structure. That structure included parallel end walls, which were spaced apart and which were oppositely and vertically centered adjacent the predetermined shear segment in the beam structure. Strain gauges were mounted to each parallel end wall of the stress isolation webs, and bearings were operative on the beam structure at predetermined locations outside each said stress isolation web. An interiorly disposed channel structure was further provided in the beam structure for housing the electrical communicative wiring of the strain gauges. The channel structure further included a centrally disposed aperture extending through the lateral sides of the beam, an aperture through each stress isolation web, and a longitudinally extending channel extending from one of each pair of the opposing circular apertures to the centrally disposed aperture. A sealing material in the interiorly disposed channel structure was further provided for isolating and protecting the electrical communicative wiring from environmental interaction.

U.S. Pat. No. 4,848,493 issued Jul. 18, 1989 to R. W. Hitchcock for "Load Sensing Structure for Weighing Apparatus" provided a load sensing structure for a weighing scale deck, which included two or more low profile flexure members, each of which was shaped like the letter "E", with two outer legs secured to the deck and the inner leg to the platform. The inner leg had twice the bending strength and stiffness of the two outer legs. All legs had their ends connected in cantilever fashion, either to a common base or to one or the other of the deck and platform. Strain gauges on one leg provided complementary inputs to a bridge circuit under weight loads, but tend to cancel their effects on the bridge circuit under other load conditions.

The present invention in its general form will first be described, and then its implementation in terms of specific embodiments will be detailed with reference to the drawings following hereafter. These embodiments are intended to demonstrate the principle of the invention, and the manner of its implementation. The invention in its broadest sense and more specific forms will then be further described and defined, in each of the individual claims, which conclude this specification.

SUMMARY OF THE INVENTION

A principal aim of the present invention is to provide such a weigh-in-motion scale, which is capable of weighing of heavier loads than previously known weigh-in-motion scales.

The present invention is based on the surprising discovery that, by making a slight increase in the thickness of the bending plate coupled with a change in the lateral locations of the load cells, the improved weigh-in-motion scale can be provided, which is capable of accurate weighing of heavier loads than previously known weigh-in-motion scales.

STATEMENT OF INVENTION

Thus, the present invention, in one broad aspect, provides a weigh-in-motion scale comprising: a rectangular parallepiped frame for installation into the pavement of a roadway and a thin, flexibly-deformable plate system secured within that frame. The thin, flexibly-deformable plate system is of rectangular parallepiped shape and comprises a combination of interrelated elements. The flexibly-deformable metal plate system has a thickness of about 0.604 inches to about 0.756 inches and includes at least two parallel, longitudinally-extending, strain gauge channels, each of the strain gauge channels being spaced by an amount of about 52% to about 54% of the distance from the center line of the metal plate to the respective longitudinal edge thereof. One or more strain gauges are bonded within an associated one of the longitudinally-extending strain gauge channels in an environmentally-isolated manner, while being capable of movement. At least two transversely-extending cross-channels are also provided in the metal plate system, the transversely-extending cross-channels providing conduits. One or more wiring harnesses, which include electrical communicative wires or cables, are operatively associated with an associated one or more strain gauges, each wiring harness being secured within an associated one of the transversely-extending cross-channels in a manner, which isolates and protects the electrical communicative wires or cables from environmental interaction. The electrically-conductive wires or cables are electrically connected to the one or more strain gauges in an electrical bridge circuit, for example, Wheatstone bridge circuit, to provide input signals to the electrical bridge circuit.

FEATURES OF THE INVENTION

By one feature of this invention, the flexibly-deformable, metal plate system comprises a steel plate having a thickness of about 0.720 inches.

By another feature of this invention, each of the strain gauge channels is spaced by an amount of about 53% of the distance from the center line of the bottom or lower metal plate to the respective longitudinal edge of the bottom or lower metal plate.

By another feature of this invention, each strain gauge is encapsulated in a rubber putty, e.g., plastic putty, butyl rubber putty, polyurethane rubber putty, epoxy rubber putty, and silicone rubber putty, so as to be secured, in an environmentally-protected manner, within its associated longitudinally-extending channel.

By another feature of this invention, each of the wire harnesses is encapsulated in a rubber putty, e.g., plastic putty, butyl rubber putty, polyurethane rubber putty, epoxy rubber putty, and silicone rubber putty, to be secured, in an environmentally-protected manner, within its associated transversely-extending channel.

By another feature of this invention, each of the longitudinally-extending strain gauge channels, which encapsulates an associated strain gauge within a rubber putty, includes an upper surface thereof, the upper surface comprising the top of the rubber putty, the upper surface being covered with a foil tape, and including a rubber overlay atop the bottom or lower metal plate in the areas surrounding the foil tape over each of the strain gauge channels.

By another feature of this invention, each of the longitudinally-extending strain gauge channels, which houses the one or more strain gauges, also includes associated electrically-conductive wires or cables to wiring harnesses.

By another feature of this invention, each of the longitudinally-extending strain gauge channels, which houses the one or more strain gauges and which also includes associated electrically-conductive wires or cables to the one or more wiring harnesses, further includes a first lower layer of a suitable elastomeric material, which is superposed atop each associated strain gauge, and a second upper layer of a suitable elastomeric material encapsulating each associated strain gauge.

By another feature of this invention, each of the transversely-extending cross-channels, in which each of the wire harnesses is encapsulated in a rubber putty, includes a foil tape atop an upper surface of the rubber putty, and a rubber overlay atop the metal plate in the areas surrounding the foil tape, which is atop the transversely-extending cross-channels.

By another feature of this invention, each of the transversely-extending cross-channels, in which each of the wire harnesses is encapsulated in a rubber putty, includes a foil tape atop an upper surface of the rubber putty, and a rubber overlay atop the metal plate in the areas surrounding the foil tape, which is atop the transversely-extending cross-channels, in which each of the one or more wiring harnesses is supported on a first lower layer of a suitable elastomeric material, and in which a second upper layer of a suitable elastomeric material encapsulates each associated wire harness.

By another feature of this invention, the suitable elastomeric material comprises a rubber putty, e.g., plastic putty, butyl rubber putty, polyurethane rubber putty, epoxy rubber putty, and silicone rubber putty.

By another feature of this invention, the metal plate system includes an oblique channel, through which electrically-conductive wires or cables are electrically connected to the wiring harnesses.

By another feature of this invention, the transverse edges of the thin, flexibly-deformable plate system are perpendicular to the upper plate.

By another feature of this invention, the transverse edges of the thin, flexibly-deformable plate system are beveled to merge as planar longitudinally-extending edges at the bottom or lower metal plate.

By another feature of this invention, the thin flexibly-deformable plate system is bonded to the substantially rectangular parallelepiped frame by an elastomeric material, preferably a pad of Neoprene™.

By another feature of this invention, the thin flexibly-deformable plate system is encapsulated by an elastomeric material, preferably Neoprene™.

OPERATION OF THE INVENTION

In operation, as weight is applied to the weigh-in-motion scale, the upper flexibly-deformable metal plate system bends, wherein the degree of bending is indicative of the weight applied, and applies force to the strain gauges, which thus provide a changing resistive value, which is indicative of the bending of the flexible element and the weight applied. Preferably, the bending of the metal plate system is elastic, and changing resistive value is proportional to the degree of bending and the weight applied. This generates input signals to the Wheatstone bridge circuit, which then generates output signals from the Wheatstone bridge circuit, which are indicative of, and preferably proportional to, the force applied to the upper, flexibly-deformable metal plate system. This provides a numerical value of the weight applied.

BRIEF DESCRIPTION OF THE DRAWINGS

In the accompanying drawings.

DETAILED DESCRIPTION OF THE EMBODIMENTS OF THE INVENTION

Figure 1:
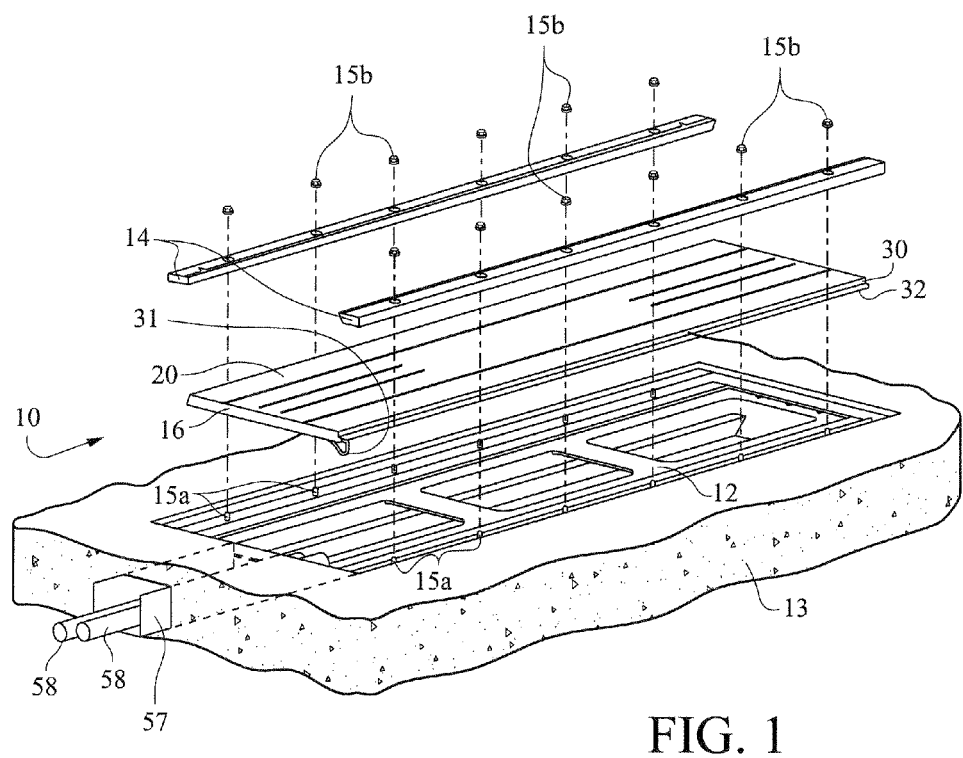
FIG. 1 is an isometric, exploded view of the weigh-in-motion scale of one embodiment of the present invention showing the frame and the thin flexibly-deformable plate system, which is secured within the frame.

The present invention in its broad aspect as above described, provides a weigh-in-motion scale (10), which includes a rectangular parallepiped frame (12) for installation into the pavement of a roadway (13). A thin, flexibly-deformable plate system (20) is secured within the rectangular parallepiped frame (12). The thin, flexibly-deformable plate system (20) is in the form of a rectangular parallepiped shape. The flexibly-deformable plate system (20) includes at least two parallel, longitudinally-extending, strain gauge channels (52) (see FIG. 4). At least one strain gauge (82) is bonded within an associated one (52) of the longitudinally-extending strain gauge channels (52) in an environmentally-isolated manner to provide environmental protection (73), while being capable of movement. At least two transversely-extending cross-channels (54) are provided in the metal plate (16), each of the transversely-extending cross-channels (54) thus providing conduits.

Figure 5:
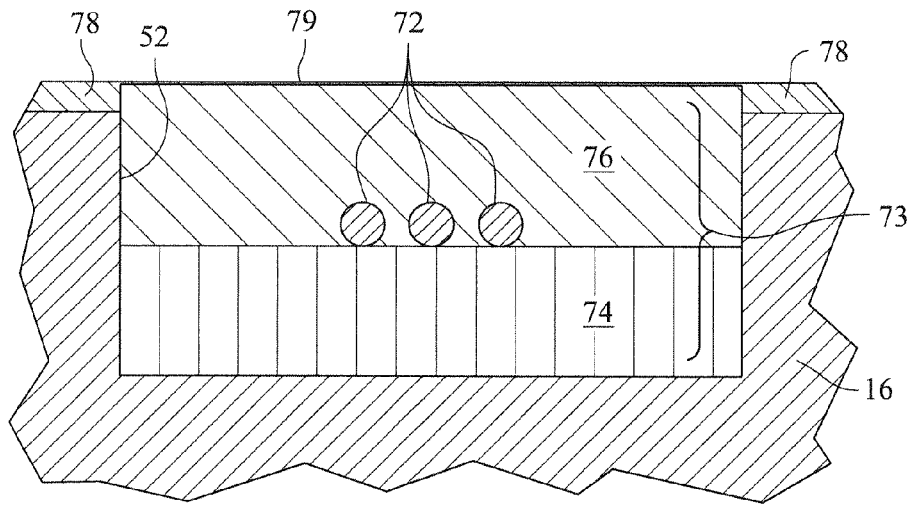
FIG. 5 is a cross-section through a longitudinally-extending strain gauge channel of the thin flexibly-deformable plate system of one embodiment of the present invention as taken along line 5-5 in FIG. 4 showing the structural relationship between the longitudinally-extending strain gauge channel and the wire harness.
Figure 6:
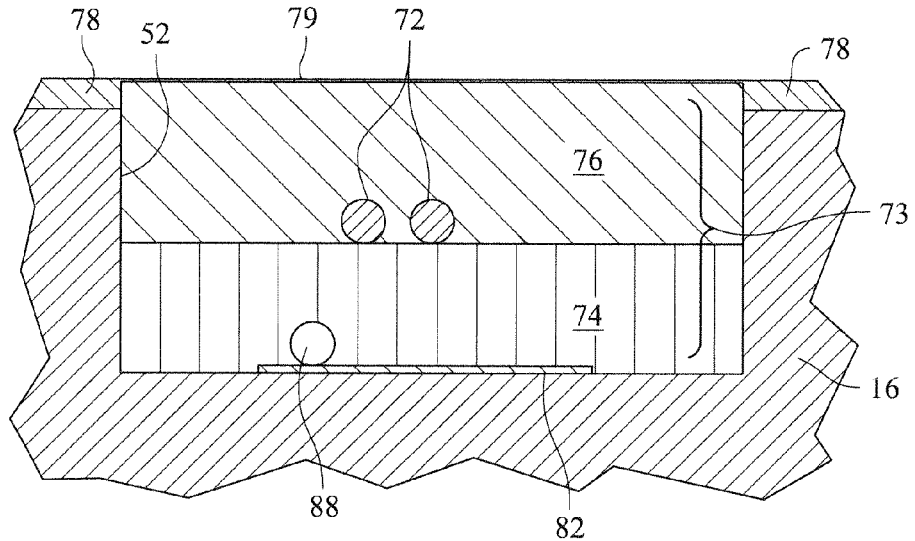
FIG. 6 is a cross-section through a longitudinally-extending strain gauge channel of the lower plate of the thin flexibly-deformable plate system of one embodiment of the present invention as taken along line 6-6 in FIG. 4 showing the structural relationship between the harness of the wires in the longitudinally-extending strain gauge channel and the strain gauge.

As is shown in FIGS. 5 and 6, at least one wiring harness (72) including electrical communicative wires or cables (58) is operatively associated with an associated strain gauge (82). Each wiring harness (72) is secured within an associated one of the longitudinally-extending channels (52) and within an associated one of the cross-channels (54) in a manner which isolates and protects the electrical communicative wires or cables (58) of the wiring harness (72) from environmental damage. The electrically-conductive wires or cables (58) are connected to an associated strain gauge (82) in an electrical bridge circuit, preferably Wheatstone bridge circuit (100) (see FIG. 7), to provide input signals to the Wheatstone bridge circuit. In one embodiment of the present invention, the metal plate system (20) comprises a thin steel plate (16).

As seen in FIG. 1, the weigh-in motion scale 10 of one embodiment of the present invention includes a substantially rectangular, parallelepiped frame 12 including means, e.g., perpendicular mounting arms 14, to secure the frame 12 within a road pavement (a portion of which is depicted by reference numeral 13) by means of bolts and nuts (a representative few of which are identified by reference numerals 15a and 15b, respectively). The thin flexibly-deformable plate system 20 (the so-called BENDING PLATE™ SYSTEM) of one embodiment of the present invention is also substantially rectangular parallelepiped shaped. It will be described in further detail hereinafter. FIG. 1 shows a flexibly-deformable metal plate 16, electrically conductive wires or cables 58 and a longitudinally-extending cable channel 57 to route the wires or cables to weight electrical signal receiving cabinet (not shown).

Figure 2:
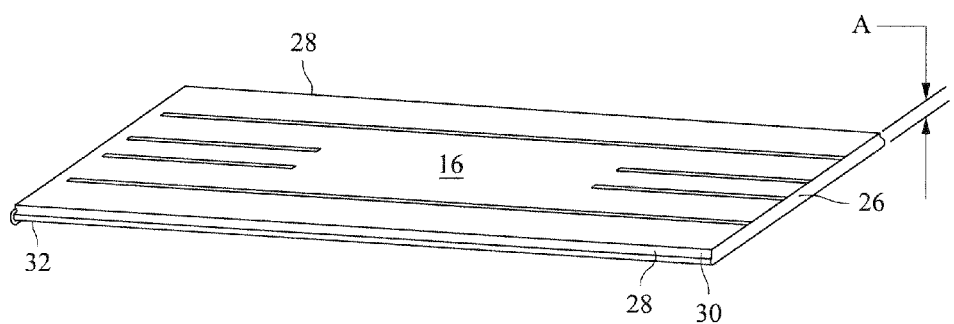
FIG. 2 is a top right hand isometric view of the thin flexibly-deformable plate system of one embodiment of the present invention opposite to the cable entrance side.
Figure 3:
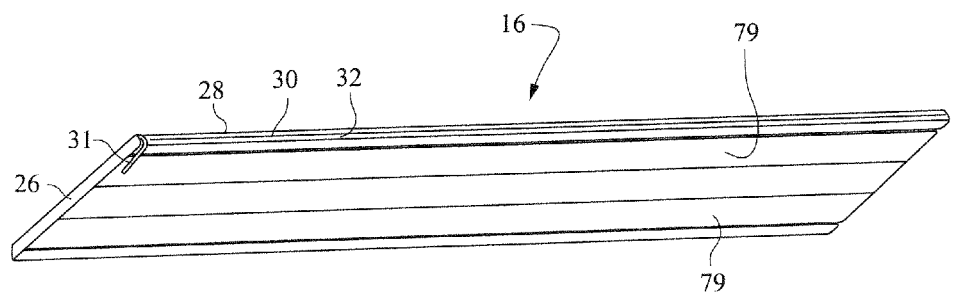
FIG. 3 is a left bottom isometric view of the thin flexibly-deformable plate system of one embodiment of the present invention at the cable entrance side.
Figure 4:
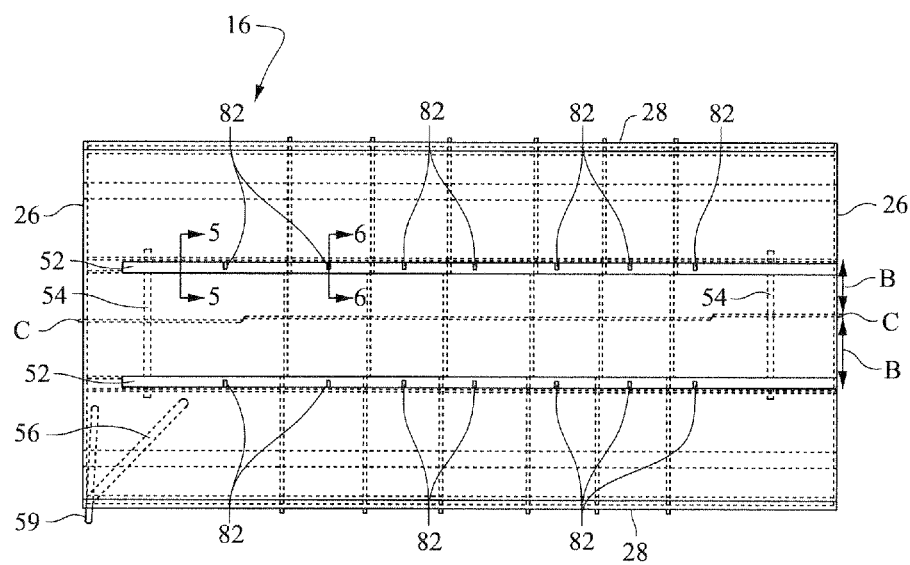
FIG. 4 is a bottom plan view of the thin flexibly-deformable plate system of one embodiment of the present invention opposite the cable entrance side.

As seen in FIGS. 2-4, the thin flexibly-deformable plate system 20 of one embodiment of the present invention is embodied in a substantially rectangular parallelepiped plate 16. Thus, the substantially rectangular parallelepiped system 20 includes a flexibly-deformable metal plate 16, (see FIG. 2 and FIG. 3), which may be formed as a thin steel plate, e.g., a rolled sheet metal, or a sheet of the aluminum alloy AlZnMgCu having a thickness "A" (see FIG. 2) of about 0.604 inches to about 0.756 inches, and preferably about 0.720 inches. This is thicker than the upper flexibly-deformable metal plate of the weigh-in-motion scales of the prior art, which is generally about 0.5 inches. This difference in thickness, together with the transverse spacing "B" of the strain gauges 82 (to be described hereinafter) from the longitudinal edges 23 (to be described hereinafter) of the thin flexibly-deformable plate system 20 of one embodiment of the present invention, results in the improvement providing of this invention. This flexibly-deformable metal plate 16 includes at least two longitudinally-extending strain gauge channels 52 (to be described hereinafter). The transversely-extending edges 26 of the thin flexibly-deformable plate system 20 are perpendicular to the flexibly-deformable metal plate 16, while the longitudinally-extending edges 28 are beveled at 30 to merge as planar longitudinally-extending edges 32. An electrical connection 31 is disposed at the junction between transverse edge 26 and longitudinally-extending edge 28 to allow connection to the strain gauges 82.

As mentioned previously, the metal plate 16 includes at least two longitudinally-extending strain gauge channels 52, within which the strain gauges 82 (in the manner which is shown in FIG. 6) are secured.

The strain gauge channels 52 are each spaced by a distance "B" of about 52% to about 54%, preferably about 51%, of the distance from the centre line "C" of the metal plate 16 towards the longitudinal edge 28 thereof (see FIG. 4). In other words, if the distance from the center line "C" to the longitudinal edge 28 is 100%, the distance from the centre line "C" to the strain gauge channel 52 (i.e., distance "B") is about 52% to about 54%, preferably about 51% of that distance.

For example, for a metal plate 16, which is 19.961 inches wide, the strain gauge channels 52 are spaced 5.316 inches from the center line "C" of the metal plate 16.

FIG. 4 also shows a diagonal channel 56, which connects a tube 59 and its associated electrical connection 31 (see FIG. 3) to one of the longitudinally-extending channels 52.

A comparison of the critical dimensions of the thin flexibly-deformable plate system 20 of one embodiment of the present invention with the critical dimensions of the prior art gives the following results:

CRITICAL DIMENSIONS OF THE PRESENT THIN FLEXIBLY-DEFORMABLE PLATE SYSTEM OF THE EMBODIMENT OF THE PRESENT INVENTION

The width of the metal plate 16 is 19.961 inches;
The spacing "B" of the strain gauge channels from the center line "C" of the metal plate 16 is 5.316 inches; and
The thickness of the flexibly-deformable metal plate 16 is 0.720 inches.

CRITICAL DIMENSIONS OF THE THIN FLEXIBLY-DEFORMABLE PLATE SYSTEM OF THE PRIOR ART

The width of a metal plate is 19.961 inches;
The spacing "B" of strain gauge channels from a center line "C" of the metal plate is 4.941 inches; and
The thickness of the flexibly-deformable metal plate is 0.630".

THE MAXIMUM WEIGHT MEASURABLE IS AS FOLLOWS:

FOR THE THIN FLEXIBLY-DEFORMABLE PLATE SYSTEM OF AN EMBODIMENT OF THE PRESENT INVENTION

15 Tonnes/axle+10%

FOR THE THIN FLEXIBLY-DEFORMABLE PLATE SYSTEM OF THE PRIOR ART

10 Tonnes/axle+10%

Thus, the thin flexibly-deformable plate system 20 of one embodiment of the present invention provides an unexpected dramatic improvement (i.e., about 50%) over the prior art by making only a slight increase in the thickness of the bending plate coupled with a change in the lateral locations of the load cells As seen in FIG. 5, each longitudinally-extending channel 52 of the metal plate 16 houses an associated wiring harness 72. Each longitudinally-extending channel 52 includes a first lower layer 74 of a suitable elastomeric material, e.g., a rubber putty, for example NEOPRENE™ rubber (NEOPRENE is the trade mark of DuPont corporation for its brand of polychloroprene synthetic rubbers). Each wiring harness 72 is supported on this first lower layer 74 of the suitable elastomeric material, and is then encapsulated by a second upper layer 76 of a suitable elastomeric material, e.g., a rubber putty, for example NEOPRENE™ rubber. The metal plate 16 in the region of the longitudinally-extending channel 52 is protected by an elastomeric layer 78, e.g., of Neoprene™. The second upper layer 76 of a suitable elastomeric material is covered by a foil tape 79. The area surrounding the foil tape 79 is covered by a layer 78 of a suitable elastomeric material, e.g., a rubber putty, for example NEOPRENE™ rubber.

The thin flexibly-deformable plate system 20 of one embodiment of the present invention is bonded to the substantially rectangular parallelepiped frame 12 by an elastomeric material. For example, this may be done by means of a lower pad of NEOPRENE™ rubber. The thin flexibly-deformable plate system 20 of one embodiment of the present invention may be alternatively encapsulated (not shown) by the same NEOPRENE™ rubber. These two elastomeric material encapsulations 74, 76 of the wiring harness 72 and the electrically conductive leads or cables 88 are identified in FIG. 5 collectively as environmental protection 73. The environmental protection 73 thus provides protection against the ingress of moisture and dirt.

As seen in FIG. 6, each longitudinally-extending strain gauge channel 52 houses the strain gauge 82 as well as the electrically-conductive leads or cables 88 to its associated wiring harnesses 72. As was described briefly above with reference to FIG. 5, each longitudinally-extending strain gauge channel 52 in the vicinity of the strain gauges 82 likewise includes a first lower layer 74 of a suitable elastomeric material, e.g., a rubber putty, for example, NEOPRENE™ rubber. Each strain gauge 82 is supported on the bottom of the longitudinally-extending strain gauge channel 52 and is encased within this first lower layer 74 of a suitable elastomeric material e.g., a rubber putty, for example NEOPRENE™ rubber. The electrically-conductive leads or cables 88 are encased within this first lower layer 74, and are operatively associated with the strain gauge 82. Each strain gauge 82 and its associated electrically-conductive leads or cables 88 are encapsulated by a second upper layer 76 of a suitable elastomeric material, e.g., a rubber putty, for example NEOPRENE™ rubber. The lower metal plate 16 in the region of each longitudinally-extending channel 52 is protected by an elastomeric layer 78, e.g., of NEOPRENE™ rubber, while the second upper layer 76 of a suitable elastomeric material e.g., of NEOPRENE™ rubber, is covered by a foil tape 79.

These two elastomeric material encapsulations 74, 76 are identified collectively in FIG. 6 as environmental protection 73. This provides protection against the ingress of moisture and dirt.

Thus, to summarize, strain gauges 82 are bonded to the bare metal of the longitudinally-extending channels 52 of the metal plate 16. The strain gauges 82 are encapsulated in a rubber putty, 74, e.g., NEOPRENE™ rubber, which does not hinder the movement of the strain gauges 82. The two longitudinally-extending channels 52 formed in the bottom of the metal plate 16 also have the wiring harnesses 72 secured therewithin. The wiring harnesses 72 are positioned on the rubber putty 74 and are also encapsulated in a rubber putty 76, e.g., NEOPRENE™ rubber. Additionally, the metal plate 16 includes an oblique channel 56 (best seen in FIG. 4) through which electrically-conductive leads or cables 58 from an electrical signal receiving cabinet (not shown) are routed in channel 57 and connected to the wiring harnesses 72.

Figure 7:
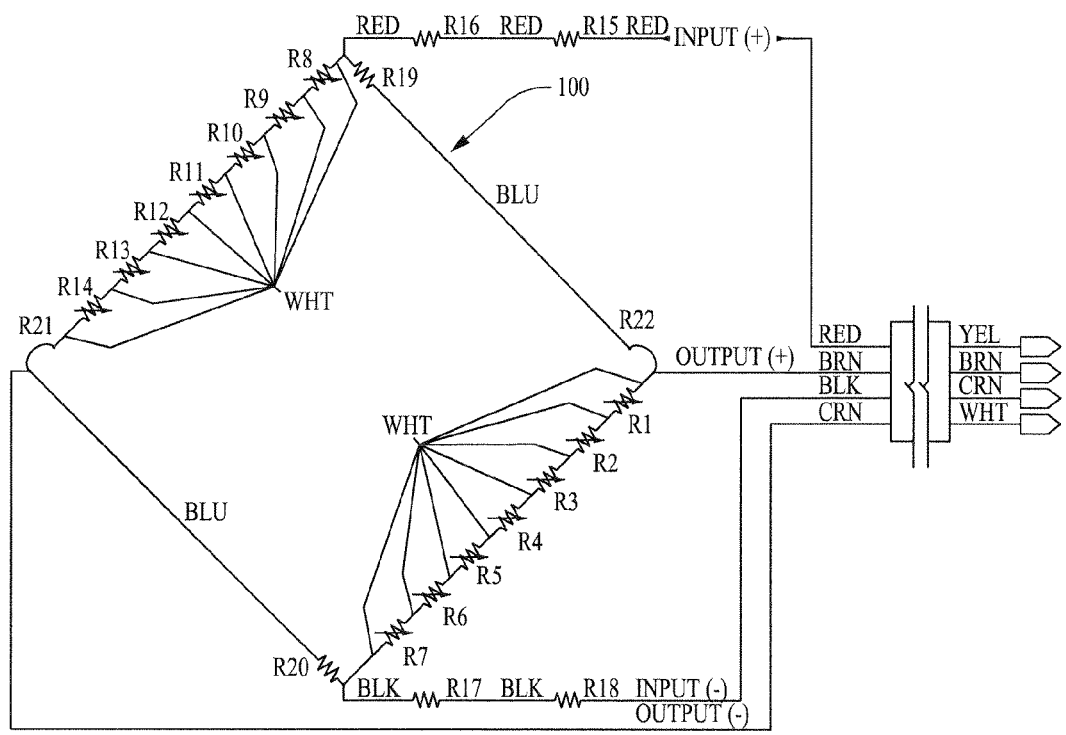
FIG. 7 is a schematic representation of the Wheatstone bridge circuit forming part of the thin flexibly-deformable plate system of one embodiment of the present invention.

As noted hereinabove, FIG. 7 is a schematic representation of the Wheatstone bridge circuit 100, forming an adjunct to the thin flexibly-deformable plate system 20 of one embodiment of the present invention. The resistor values are in this figure are:

R1-R14: 12 Ohms Strain gauge;
R15-R18: 33 Ohms;
R19, R20: 84 Ohms; and
R21,R22: resistive wire (nulling)

According to one embodiment of the present invention, the bridge resistance is as follows, measured in Ohms:

|  | −INPUT | +INPUT | −OUTPUT | SHIELD | BODY |
| --- | --- | --- | --- | --- | --- |
| +INPUT | 9720 +/− 20 | 6960 +/− 20 | 6960 +/− 20 | OL | OL |

-continued

|  | −INPUT | +INPUT | −OUTPUT | SHIELD | BODY |
|---|---|---|---|---|---|
| − INPUT |  | 6960 +/20 | 6920 +/20 | OL | OL |
| +OUTPUT |  |  | 8400 +/− 10 | OL | OL |
| −OUTPUT |  |  |  | OL | OL |
| SHIELD |  |  |  |  | OL |

In use, as weight is applied to the weigh-in-motion scale 10, the upper flexibly-deformable metal plate 16 of the thin, flexibly-deformable plate system bends, and its deformation is indicative of the force of the weight applied, preferably bending elastically so that the deformation is proportional to the weight applied. The strain gauges 82 provide a changing resistive value, associated with the bending, preferably proportional to the bending, of the flexibly-deformable metal plate 16. The weight, through the force thus detected, applies input signals to the Wheatstone bridge circuit. The Wheatstone bridge circuit 100 then generates output signals, which are indicative, preferably proportional, to the force applied to the flexibly-deformable metal plate 16 and thus, provides a measure of the weight applied.

The Wheatstone bridge circuit is a preferred implementation, other types of electrical bridge circuits, e.g., Kelvin double bridge circuit, or other known electrical circuits for measuring resistance may also be suitable.

Although Neoprene™ has been used as a preferred elastomeric material in the embodiments of the present invention, it is understood that other elastomeric materials, e.g., variations of the rubber putty can also be used, e.g., plastic putty, butyl rubber putty, polyurethane rubber putty, epoxy rubber putty, and silicone rubber putty.

CONCLUSION

The foregoing has constituted a description of specific embodiments showing how the invention may be applied and put into use. These embodiments are only exemplary. The invention in its broadest, and more specific aspects is further described and defined in the claims, which follow.

These claims, and the language used therein are to be understood in terms of the variants of the invention, which have been described. They are not to be restricted to such variants, but are to be read as covering the full scope of the invention as is implicit within the invention and the disclosure that has been provided herein.

The invention claimed is:

1. A weigh-in-motion scale for weighing traveling wheeled vehicles, comprising:
a rectangular parallepiped frame for installation into the pavement of a roadway; and
a thin, flexibly-deformable plate system having a rectangular parallepiped shape with edges thereof secured within the frame, wherein the thin, flexibly deformable plate system comprises:
a) a flexibly-deformable metal plate having a thickness of about 0.604 inches to about 0.756 inches;
b) said flexibly deformable metal plate including at least two parallel, longitudinally-extending strain gauge channels, each of said longitudinally-extending strain gauge channels being latitudinally spaced from a center line "C" of said flexibly deformable metal plate by a distance "B", which is about 52% to 54% of a distance from the center line "C" of said flexibly deformable metal plate to a respective longitudinal edge of said flexibly deformable metal plate;
c) a series of strain gauges positioned in each of the strain gauge channels;
d) at least two transversely-extending cross-channels in said flexibly deformable metal plate to provide communication between the strain gauge channels;
e) a first elastomeric material layer positioned within each of the strain gauge channels to encapsulate the strain gauges therein;
f) wiring harnesses operatively associated with the strain gauges in the strain gauge channels, each said wiring harness including electrical communicative wires operatively connected to a respective one of the strain gauges in an electrical bridge circuit to provide input signals to the electrical bridge circuit, wherein the wiring harnesses are supported by the first layer of elastomeric material in the strain gauge channels and extend to a respective one of said transversely-extending cross-channels;
g) a second elastomeric material layer which is positioned over the first elastomeric material layer to encapsulate the wiring harnesses supported thereby; wherein
the flexibly-deformable metal plate elastically bends in response to weight being applied thereto to in turn cause the strain gauges to provide a changing resistive value indicative of the bending of said flexibly-deformable metal plate and the weight applied thereto, thereby generating input signals to the electrical bridge circuit, which in turn then generates output signals from the electrical bridge circuit which are indicative of the force applied to the flexibly-deformable metal plate and thereby provide numerical value of the weight applied.

2. The weigh-in-motion scale of claim 1, wherein the electrical bridge circuit is a Wheatstone bridge circuit.

3. The weigh-in-motion scale of claim 1, wherein said flexibly-deformable metal plate comprises a steel plate having a thickness of about 0.720 inches.

4. The weigh-in-motion scale of claim 1, wherein each of said longitudinally-extending strain gauge channels is spaced from a center line "C" of said bottom or lower metal plate by a distance "B", which is about 53% of a distance from the center line "C" of said bottom or lower plate to a longitudinal edge thereof.

5. The weigh-in-motion scale of claim 1, wherein at least one of the first and second elastomeric material layers is a rubber putty.

6. The weigh-in-motion scale of claim 1, wherein a surface of the second elastomeric material layer is covered by a foil tape.

7. The weigh-in-motion scale of claim 1, wherein the strain gauges are in direct contact with the metal plate within each of said longitudinally-extending strain gauge channels.

8. The weigh-in-motion scale of claim 1, wherein transverse edges of said metal plate are beveled to merge as planar longitudinally-extending edges.

9. The weigh-in-motion scale of claim 1, wherein said metal plate includes an oblique channel through which electrically-conductive leads or cable are connected to said wiring harnesses.

10. The weigh-in-motion scale of claim 1, wherein said thin flexibly-deformable plate system is bonded to said substantially rectangular parallelepiped frame by an elastomeric material.

11. The weigh-in-motion scale of claim 10, wherein said thin flexibly-deformable plate system is bonded to said substantially rectangular parallelepiped frame by a pad of polychloroprene rubber.

12. The weigh-in-motion scale of claim 1, wherein said flexibly-deformable plate system is encapsulated by a polychloroprene rubber.

13. A thin, flexibly-deformable plate system having a rectangular parallepiped shape, for assembly within a rectangular parallepiped frame, in weigh-in-motion scale, said thin, flexibly-deformable plate system comprising:
 a) a flexibly-deformable metal plate having a thickness of about 0.604 inches to about 0.756 inches;
 b) said flexibly deformable metal plate including at least two parallel, longitudinally-extending strain gauge channels which are latitudinally spaced from a center line "C" of said flexibly deformable metal plate by a distance "B", which is about 52% to 54% of a distance from the center line "C" of said flexibly deformable metal plate to a respective longitudinal edge of said flexibly deformable metal plate;
 c) a series of strain gauges positioned in each of the strain gauge channels;
 a first elastomeric material layer positioned within each of the strain gauge channels to encapsulate the strain gauges therein;
 e) at least two transversely-extending cross-channels in said flexibly deformable metal plate to provide communication between the strain gauge channels;
 f) wiring harnesses operatively associated with the strain gauges in the strain gauge channels, each said wiring harness including electrical communicative wires operatively connected to a respective one of the strain gauges in an electrical bridge circuit to provide input signals to the electrical bridge circuit, wherein the wiring harnesses are supported by the first layer of elastomeric material in the strain gauge channels and extend to a respective one of said transversely-extending cross-channels;
 g) a second elastomeric material layer which is positioned over the first elastomeric material layer to encapsulate the wiring harnesses supported thereby; wherein
 the flexibly-deformable metal plate elastically bends in response to weight being applied thereto to in turn cause the strain gauges to provide a changing resistive value indicative of the bending of said flexibly-deformable metal plate and the weight applied thereto, thereby generating input signals to the electrical bridge circuit, which in turn then generates output signals from the electrical bridge circuit which are indicative of the force applied to the flexibly-deformable metal plate and thereby provide a numerical value of the weight applied.

14. The thin, flexibly-deformable plate system of claim 13, wherein at least one of the first and second elastomeric material layers is a rubber putty; and wherein a surface of the second elastomeric material layer is covered by a foil tape with a rubber overlay in an area surrounding said foil tape.

15. The thin, flexibly-deformable plate system of claim 13, wherein transverse edges of said metal plate are substantially perpendicular.

16. The thin, flexibly-deformable plate system of claim 13, wherein transverse edges of said metal plate are beveled to merge as planar longitudinally-extending.

17. The thin, flexibly-deformable plate system of claim 13, wherein the strain gauges are in direct contact with the metal plate within each of said longitudinally-extending strain gauge channels.

\* \* \* \* \*